(12) United States Patent
Kim et al.

(10) Patent No.: US 11,893,068 B2
(45) Date of Patent: Feb. 6, 2024

(54) ELECTRONIC DEVICE AND CONTROL METHOD THEREOF

(71) Applicant: SAMSUNG ELECTRONICS CO., LTD., Suwon-si (KR)

(72) Inventors: Minkyung Kim, Suwon-si (KR); Sehun Park, Suwon-si (KR); Youngkyun Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 17/431,366

(22) PCT Filed: Jan. 22, 2020

(86) PCT No.: PCT/KR2020/001083
§ 371 (c)(1),
(2) Date: Aug. 16, 2021

(87) PCT Pub. No.: WO2020/197071
PCT Pub. Date: Oct. 1, 2020

(65) Prior Publication Data
US 2022/0147582 A1    May 12, 2022

(30) Foreign Application Priority Data

Mar. 22, 2019 (KR) .......................... 10-2019-0032762

(51) Int. Cl.
*G06F 16/953* (2019.01)
(52) U.S. Cl.
CPC ................................. *G06F 16/953* (2019.01)
(58) Field of Classification Search
CPC .................................................. G06F 16/953
See application file for complete search history.

(56) References Cited

U.S. PATENT DOCUMENTS

| 7,302,437 B2 * | 11/2007 | Cho ..................... G11B 27/034 |
| 7,668,853 B2 * | 2/2010 | Trepess ................. G06F 16/358 |
| | | 715/848 |

(Continued)

FOREIGN PATENT DOCUMENTS

| JP | 2007-142492 A | 6/2007 |
| JP | 2008-204198 A | 9/2008 |

(Continued)

OTHER PUBLICATIONS

Communication (PCT/ISA/224) dated May 6, 2022 in International Application No. PCT/KR2022/001083.

(Continued)

*Primary Examiner* — Mark E Hershley
(74) *Attorney, Agent, or Firm* — Sughrue Mion, PLLC

(57) ABSTRACT

An electronic device includes a memory; and a processor configured to: store metadata received from a plurality of data sources, respectively, in the memory; obtain first information corresponding to a preset attribute from among attribute information comprised in first metadata received from a first data source from among the plurality of data sources; obtain second information corresponding to the preset attribute from among attribute information comprised in second metadata received from a second data source; and map, based on the first metadata and the second metadata being identified as metadata on a content based on a similarity between the first information and the second information, an integrated metadata generated based on the first metadata and the second metadata to the content and store the integrated metadata generated based on the first metadata and the second metadata in the memory.

14 Claims, 9 Drawing Sheets

(56) References Cited

U.S. PATENT DOCUMENTS

| | | | | |
|---|---|---|---|---|
| 7,849,050 | B2* | 12/2010 | Mangipudi | G06F 16/254 707/602 |
| 7,962,937 | B2* | 6/2011 | Cho | H04N 21/84 725/59 |
| 8,126,881 | B1* | 2/2012 | Sethi | G06F 16/907 707/723 |
| 8,335,801 | B2* | 12/2012 | Gardner | G06F 16/48 707/791 |
| 8,554,800 | B2* | 10/2013 | Goldentouch | G06F 16/81 707/797 |
| 8,942,470 | B2* | 1/2015 | Ni | G06F 40/30 382/159 |
| 9,031,895 | B2* | 5/2015 | Schon | G06F 16/24564 706/48 |
| 9,154,386 | B2* | 10/2015 | Johnson | G06F 11/3086 |
| 9,158,794 | B2* | 10/2015 | Higgins | H04L 67/06 |
| 9,258,610 | B2* | 2/2016 | Kulick | G06F 16/7867 |
| 9,547,699 | B2* | 1/2017 | Roche | G06F 16/248 |
| 9,589,072 | B2* | 3/2017 | Ray | G06F 16/90335 |
| 9,690,830 | B2* | 6/2017 | Decker | G06F 16/24573 |
| 9,904,715 | B1* | 2/2018 | Taylor | G06F 16/24 |
| 9,934,227 | B2* | 4/2018 | Schmidt | G06F 16/13 |
| 9,992,540 | B2* | 6/2018 | Casey | H04N 21/4345 |
| 2002/0033844 | A1* | 3/2002 | Levy | G06F 3/0484 715/744 |
| 2005/0165816 | A1* | 7/2005 | Schiller | G06F 16/583 707/E17.02 |
| 2007/0156726 | A1* | 7/2007 | Levy | H04N 21/2343 |
| 2008/0082569 | A1* | 4/2008 | Mansour | G06Q 10/10 707/999.102 |
| 2011/0238650 | A1* | 9/2011 | Jenkins | G06F 9/451 707/706 |
| 2012/0203782 | A1* | 8/2012 | Olston | G06F 16/25 707/E17.046 |
| 2014/0006951 | A1* | 1/2014 | Hunter | H04N 21/4821 715/719 |
| 2014/0129182 | A1* | 5/2014 | Weatherhead | G05B 19/042 703/1 |
| 2014/0129550 | A1* | 5/2014 | Weatherhead | G06F 16/248 707/723 |
| 2017/0103164 | A1* | 4/2017 | Dunlevy | G06F 16/24575 |
| 2017/0109391 | A1* | 4/2017 | Rosen | G06F 16/5866 |
| 2017/0177584 | A1* | 6/2017 | Narasimha | H04N 21/8352 |
| 2017/0187823 | A1* | 6/2017 | DuBois | H04L 67/5681 |
| 2017/0199875 | A1* | 7/2017 | Nevrekar | G06F 16/9032 |
| 2017/0357503 | A1* | 12/2017 | Kronmueller | G06F 9/4492 |
| 2018/0089185 | A1* | 3/2018 | Romano | G06F 16/258 |
| 2019/0303367 | A1* | 10/2019 | Hsiao | G06F 16/2425 |
| 2020/0042648 | A1* | 2/2020 | Rao | G06F 16/2457 |
| 2020/0077151 | A1* | 3/2020 | Swerdlow | G06F 16/738 |
| 2020/0104321 | A1* | 4/2020 | Sharma | G06F 16/212 |
| 2020/0327252 | A1* | 10/2020 | Mcfall | H04L 9/008 |
| 2021/0173828 | A1* | 6/2021 | McPherson | G06F 16/25 |
| 2022/0147582 | A1* | 5/2022 | Kim | G06F 16/78 |

FOREIGN PATENT DOCUMENTS

| | | |
|---|---|---|
| JP | 2008-276768 A | 11/2008 |
| JP | 2018-92324 A | 6/2018 |
| KR | 10-0934543 B1 | 12/2009 |
| KR | 10-1470991 B1 | 12/2014 |
| KR | 10-1758669 B1 | 7/2017 |
| KR | 10-2018-0025091 A | 3/2018 |

OTHER PUBLICATIONS

International Search Report (PCT/ISA/210) issued by the International Searching Authority in International Application No. PCT/KR2020/001083, dated May 19, 2020.

Written Opinion (PCT/ISA/237) issued by the International Searching Authority in International Application No. PCT/KR2020/001083, dated May 19, 2020.

* cited by examiner

FIG. 1

| Category | Field |
|---|---|
| Person | person_id, name, program_id, popularity |
| Program | programs_id, program_type, content_rating, original_air_date, score, genres, season_number |

<A MOVIE METADATA - PROVIDE A DATA SOURCE>

| Category | Table name | Field |
|---|---|---|
| Person | DS_CREDIT | credit id, full name, date of birth, birth place |
| | DS_CREDIT_IMAGE | Image_url, Folder_url |
| Program | DS_PROGRAM | program id, release date |
| | DS_PROGRAM_TITLE | title |
| | DS_PROGRAM_GENRE | Genre |
| | DS_PROGRAM_CREDIT | credit type, role name |
| | DS_PROGRAM_IMAGE | Image_url |
| | DS_SCHEDULE | TV Ratings |

<A MOVIE METADATA - PROVIDE B DATA SOURCE>

FIG. 7

<PROGRAM COMMON FORMAT>

| Column | Type | Default Value | Nullable | Character Set | Collation | Privileges |
|---|---|---|---|---|---|---|
| ID | char(20) | | NO | utf8 | utf8_general_ci | select,insert,update,references |
| TITLE | varchar(255) | | YES | utf8 | utf8_general_ci | select,insert,update,references |
| YEAR | char(4) | | YES | utf8 | utf8_general_ci | select,insert,update,references |
| DIRECTORS | varchar(2000) | | YES | utf8 | utf8_general_ci | select,insert,update,references |
| ACTORS | varchar(3000) | | YES | utf8 | utf8_general_ci | select,insert,update,references |
| PROGRAM_TYPE | varchar(100) | | YES | utf8 | utf8_general_ci | select,insert,update,references |
| SEASON | varchar(100) | | YES | utf8 | utf8_general_ci | select,insert,update,references |
| EPISODE | varchar(100) | | YES | utf8 | utf8_general_ci | select,insert,update,references |
| PARENT_ID | varchar(20) | | YES | utf8 | utf8_general_ci | select,insert,update,references |

<PERSON COMMON FORMAT>

| Column | Type | Default Value | Nullable | Character Set | Collation | Privileges |
|---|---|---|---|---|---|---|
| ID | char(20) | | NO | utf8 | utf8_general_ci | select,insert,update,references |
| PERSON_NAME | varchar(255) | | YES | utf8 | utf8_general_ci | select,insert,update,references |
| BIRTH_YEAR | char(4) | | YES | utf8 | utf8_general_ci | select,insert,update,references |
| PROFESSION | varchar(500) | | YES | utf8 | utf8_general_ci | select,insert,update,references |
| FILMOGRAPHY | text | | YES | utf8 | utf8_general_ci | select,insert,update,references |

ELECTRONIC DEVICE AND CONTROL METHOD THEREOF

CROSS-REFERENCE TO RELATED APPLICATION(S)

This application is a bypass continuation application of International Application PCT/KR2020/001083 filed on Jan. 22, 2021, which claims priority to Korean Patent Application No. 10-2019-0032762, filed on Mar. 22, 2019, in the Korean Intellectual Property Office, the disclosures of which are incorporated herein in their entireties by reference.

BACKGROUND

1. Field

The disclosure relates to controlling an electronic device, and more particularly, to controlling an electronic device to receive and manage metadata and an associated method.

2. Description of Related Art

Metadata generated by different producers on one content may be available and formats of this metadata may be varied. For example, as shown in FIG. 1, the metadata format generated by A data source (producer) on one content such as A movie may be varied from the metadata format generated by B data source (producer).

In addition, different metadata on one content (A content) may not only be varied, but field values included therein may also be varied. For example, actor or actress information may not be included in the metadata generated from the A data source, and year of release may not be included in the metadata generated from the B data source.

In this case, if actor or actress information is searched in the metadata generated from the A data source, there may be the problem of the information not being found in the A content.

SUMMARY

Provided is an electronic device which obtains an attribute from a plurality of metadata sets and integrates the plurality of metadata sets on one content as one.

According to an aspect of the disclosure, an electronic device may include a memory; and a processor configured to: store metadata received from a plurality of data sources, respectively, in the memory; obtain first information corresponding to a preset attribute from among attribute information comprised in first metadata received from a first data source from among the plurality of data sources; obtain second information corresponding to the preset attribute from among attribute information comprised in second metadata received from a second data source; and map, based on the first metadata and the second metadata being identified as metadata on a content based on a similarity between the first information and the second information, an integrated metadata generated based on the first metadata and the second metadata to the content and store the integrated metadata generated based on the first metadata and the second metadata in the memory.

The processor may be further configured to identify, based on a third metadata received from a third data source being identified as metadata on the content as with the second metadata, whether the first metadata, the second metadata, and the third metadata are metadata on the content based on attribute information comprised in the first metadata and the third metadata, and map, based on the first metadata, the second metadata, and the third metadata being identified as metadata on the content, an integrated metadata generated based on the first metadata, the second metadata, and the third metadata to the content and store in the memory.

The processor may be further configured to identify whether the first metadata, the second metadata, and the third metadata are metadata on the content based on attribute information corresponding to an attribute different from the preset attribute from among attribute information comprised in the first metadata and the third metadata.

The processor may be further configured to generate the integrated metadata by including attribute information corresponding to an attribute comprised in the first metadata and not comprised in the second metadata to the integrated metadata.

The preset attribute may include at least one from among a title, a type, a production year, character information, producer information, or country information of a content.

The processor may be further configured to identify the similarity between the first information and the second information based on a text similarity between the first information and the second information, or alias information included in at least one from among the first information or the second information.

The processor may be further configured to identify the text similarity based on an algorithm comprising at least one from among a Longest Common Subsequence algorithm, a N-Gram algorithm, a Soundex algorithm, or a Levenshtein Distance algorithm.

The processor may be further configured to obtain the first metadata and the second metadata in a filtered dataset from an external search engine, and the first metadata and the second metadata may be filtered based on a similarity between information corresponding to the preset attribute from among attribute information comprised in the first metadata and the second metadata.

The processor may be further configured to identify the similarity between the first information and the second information by applying different weights to respective attribute information based on content type information included in the first metadata and the second metadata.

The processor may be further configured to search and provide, based on a content search request being received from an external device, content corresponding to the content search request based on the integrated metadata.

According to another aspect of the disclosure, a method of controlling an electronic device may include storing metadata received from a plurality of data sources, respectively; obtaining first information corresponding to a preset attribute from among attribute information comprised in first metadata received from a first data source from among the plurality of data sources; obtaining second information corresponding to the preset attribute from among attribute information comprised in second metadata received from a second data source; identifying whether the first metadata and the second metadata are metadata on a content based on a similarity between the first information and the second information; and mapping, based on the first metadata and the second metadata being identified as metadata on the content, an integrated metadata generated based on the first metadata and the second metadata to the content and storing the integrated metadata generated based on the first metadata and the second metadata.

The method may further include identifying, based on a third metadata received from a third data source being identified as metadata on the content as with the second metadata, whether the first metadata, the second metadata, and the third metadata are metadata on the content based on attribute information comprised in the first metadata and the third metadata, and mapping, based on the first metadata, the second metadata, and the third metadata being identified as metadata on the content, an integrated metadata generated based on the first metadata, the second metadata, and the third metadata to the content and storing.

The method may further include identifying whether the first metadata, the second metadata, and the third metadata are metadata on the content based on attribute information corresponding to an attribute different from the preset attribute from among attribute information comprised in the first metadata and the third metadata.

The mapping and storing the content may include generating the integrated metadata by including attribute information corresponding to an attribute comprised in the first metadata and not comprised in the second metadata to the integrated metadata.

The preset attribute may include at least one from among a title, a type, a production year, character information, producer information or country information of a content.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram illustrating metadata of various formats on one content;

FIG. 7 is a diagram illustrating an example of a preset format of an integrated metadata according to an embodiment;

DETAILED DESCRIPTION

Figure 2:
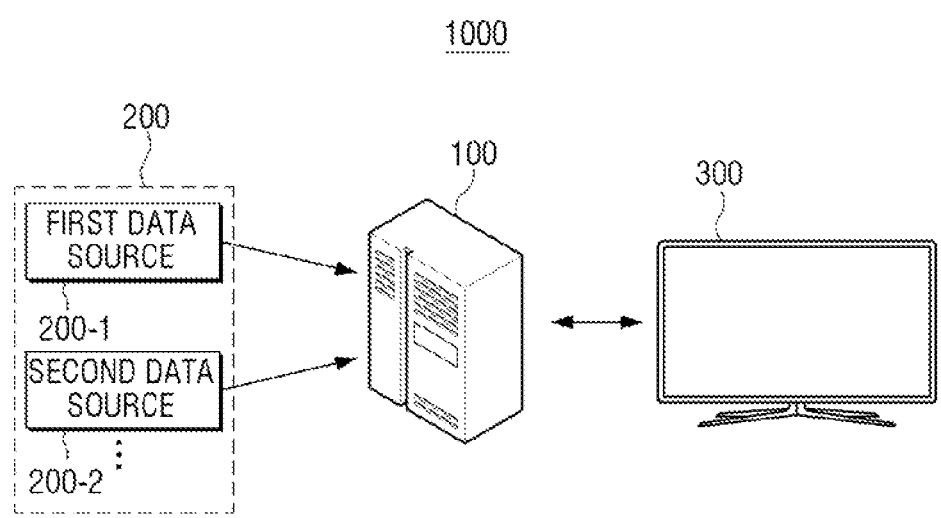
FIG. 2 is a diagram illustrating an electronic system according to an embodiment.

The disclosure will be described in detail below with reference to the accompanying drawings.

Terms used herein will be briefly described, and the disclosure will be described in detail.

The terms used in describing the various example embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed description of related known technologies may unnecessarily confuse the gist of the disclosure, the detailed description will be omitted.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The expressions "at least one of A and B" and at least one of A or B" are to be understood as indicating any one of "A" or "B" or "A and B."

Expressions such as "first," "second," "1st," "2nd" and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

The terms "module" or "part" used in the embodiments herein perform at least one function or operation, and may be implemented with a hardware or software, or a combination of hardware and software. Further, a plurality of "modules" or a plurality of "parts", except for a "module" or a "part" which needs to be implemented to a specific hardware, may be integrated to at least one module and implemented in at least one processor. In this disclosure, the term "user" may refer to a person using an electronic device or a device (e.g., artificial intelligence electronic device) using an electronic device.

Example embodiments of the disclosure will be described in detail with reference to the accompanying drawings to aid in the understanding of those of ordinary skill in the art. However, the disclosure may be realized in various different forms and it should be noted that the disclosure is not limited to the various example embodiments described herein. Further, in the drawings, parts not relevant to the description may be omitted, and like reference numerals may be used to indicate like elements.

Example embodiments of the disclosure will be described in detail below with reference to the accompanied drawings.

FIG. 2 is a diagram illustrating an electronic system according to an embodiment.

The electronic system 1000 may include an electronic device 100, a data source 200, and other electronic device 300.

The electronic device 100 may be a device configured to integrate metadata on at least one content received from the data source 200 for respective contents, and may be implemented with a server. That is, the electronic device 100 may be a device configured to generate integrated metadata of content. The electronic device 100 may be a device capable of integrating a plurality of metadata sets and may be implemented to various forms, and may be implemented as, for example, and without limitation, a smartphone, a tablet personal computer (PC), a desktop PC, a laptop PC, a netbook computer, a set-top box, a media box, a television (TV), or the like.

The data source 200 may be a device configured to transmit metadata on at least one content to the electronic device 100, and may be a device configured to generate or manage metadata. The data source 200 may be implemented as a server. A plurality of data sources 200-1 and 200-2 may be configured to generate metadata of different formats from one another, respectively, on the one content and transmit the generated metadata to the electronic device 100. For example, metadata on the one content may be varied such as, for example, and without limitation, csv, json, xml format, and the like. In addition, the data source 200 may be implemented as, for example, IMDB™, Rotten Tomatoes™, or the like which manages a database related to a content.

The other electronic device 300 may be a device configured to request information related to the content to the electronic device 100 and provide the received information. The other electronic device 300 may be implemented as, for example, and without limitation, a TV, a smartphone, a tablet PC, a mobile phone, a video phone, an e-book reader, a desktop PC, a laptop PC, a netbook computer, a personal digital assistant (PDA), a portable multimedia player (PMP), a digital versatile disc (DVD) player, an MP3 player, a camera, a wearable device, or the like.

For example, it may be assumed that the other electronic device 300 is implemented as a TV. When title information of a specific movie is input to the TV from a user, the TV may be configured to transmit a relevant title information to the electronic device 100, and the electronic device 100 may be configured to obtain movie content information corresponding to the relevant title from the stored metadata and transmit to the TV. Thereafter, the TV may be configured to provide the obtained movie content information through a display.

An example embodiment of integrating the plurality of metadata on the same content will be described in detail below with reference to the accompanied drawings.

Figure 3:
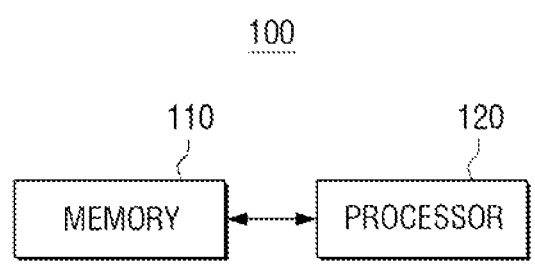
FIG. 3 is a block diagram illustrating an operation of an electronic device according to an embodiment.

FIG. 3 is a block diagram illustrating an operation of an electronic device according to an embodiment.

Referring to FIG. 3, the electronic device 100 may include a memory 110 and a processor 120.

The memory 110 may be electrically coupled with the processor 120, and may be configured to store data necessary for the various example embodiments.

The memory 110 may be implemented in the form of a memory embedded in the electronic apparatus 100 according to a data storage use, or in the form of a memory detachable from the electronic apparatus 100. For example, the data for the driving of the electronic apparatus 100 may be stored in a memory embedded to the electronic apparatus 100, and data for an expansion function of the electronic apparatus 100 may be stored in a memory detachable from the electronic apparatus 100. The memory embedded in the electronic apparatus 100 may be implemented as at least one of a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In the case of a memory attachable/detachable to the electronic apparatus 100, the memory may be implemented in the form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

According to an embodiment, the memory 110 may be configured to store metadata received from the data source 200. In addition, the memory 110 may be configured to store integrated metadata generated according to an embodiment.

The processor 120 may be electrically coupled with the memory 110, and may be configured to control the overall operation of the electronic device 100.

According to an embodiment, the processor 120 may be implemented as a digital signal processor (DSP), a microprocessor, or a time controller (TCON) which processes a digital image signal. However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or an artificial intelligence (AI) processor, or may be defined by the relevant term. In addition, the processor 12 may be implemented as a System on Chip (SoC) or large scale integration (LSI) embedded with a processing algorithm, and may be implemented in the form of a field programmable gate array (FPGA). The processor 120 may be configured to perform various functions by executing computer executable instructions stored in the memory 110.

According to an embodiment, the processor 120 may be configured to store metadata received from respective data sources 200 in the memory 110. Here, metadata may be referred to as attribute information, and may be data supplied with respect to content according to a certain rule to effectively find and use information which is sought from among a large amount of information. For example, metadata may include a title of the content, a type of the content, a location of the content, a synopsis of the content, a cast of the content, information on a writer, an authority condition, a use condition, a use history, and the like. The data source 200 may be at least one device configured to generate or manage metadata. For example, IMDB™ and Rotten Tomatoes™ which generate and manage the metadata of the content may be one example of the data source 200. The content corresponding to the metadata provided from the respective data sources 200 may be stored in a database provided in the respective data sources 200, or stored in an external database server.

The processor 120 may be configured to generate the integrated metadata on at least one content based on the plurality of metadata sets received from the plurality of data sources 200. That is, the processor 120 may be configured to generate the integrated metadata in the form of integrating various information included in the plurality of metadata sets of different formats from one another received from the plurality of data sources 200

To this end, the processor 120 may be configured to obtain first information corresponding to a preset attribute from among attribute information included in a first metadata received from a first data source from among the plurality of data sources 200. In addition, the processor 120 may be configured to obtain second information corresponding to a preset attribute from among attribute information included in a second metadata received from a second data source. Here, the attribute used in obtaining the second information may be the same attribute as the attribute used in obtaining the first information. For example, the processor 120 may be configured to identify a field including a specific attribute based on at least one from among location information or identification information corresponding to the respective fields included in the first metadata, and obtain the attribute information based on a field value included in the identified field.

The attribute may include a title, a type, a production year, character information (name, date of birth, occupation, country of origin, filmography information), producer information, country information, and the like of the content, and the attribute information may be information obtained from the field value corresponding to the attribute. For example, based on the attribute being the production year, the attribute information may be 2019, and based on the attribute being the title, the attribute information may be Island (e.g., movie title).

In addition, the preset attribute may be an attribute for identifying the plurality of metadata sets on the same content. The preset attribute may, as an attribute included in most metadata of different formats, be preset by a manufacturer, or the like, but is not limited thereto. For example, the preset attribute may be changed by the user, or changed based on the use history of the electronic device 100. In an example, the preset attribute may include at least one from among the title, the type, the production year, the character information, the producer information, or the country information of the content. For example, based on the preset attribute being the title of the content, the processor 120 may be configured to compare the first information which is the content title included in the first metadata and the second information which is the content title included in the second metadata to identify whether it is metadata on the same content.

Specifically, the processor 120 may be configured to identify whether the first metadata and the second metadata are metadata on the same content based on a similarity between the first information and the second information.

According to an embodiment, the processor 120 may be configured to identify the similarity between the first information and the second information based on a text similarity between the first information and the second information. For example, based on the preset attribute being the title, the first information and the second information may be a text of the content title. The processor 120 may be configured to identify the titles of the first information and the second information are the same not only when the texts of the first information and the second information are the same but also when they are similar if the similarity is equal to or greater than a threshold value. For example, even if the text is the same but is not recognized as the same text due to a spacing, a hyphen, or the like, the processor 120 may identify the first information and the second information as the same title based on the similarity between the first information and the second information being greater than or equal to the threshold value. Alternatively, the processor 120 may identify the similarity between the texts excluding a spacing, a hyphen, an apostrophe, a quotation mark, and the like. In addition, the processor 120 may identify the similarity of the texts without distinguishing an uppercasing and a lowercasing of the text.

The processor 120 may identify the similarity of texts based on an algorithm including at least one from among algorithms such as Longest Common Subsequence (LCS), N-Gram, Soundex, or Levenshtein (Edit) Distance. Accordingly, the processor 120 may reduce cases in which information may be determined as different information due to a notation method, a typo, an omitted spelling, and the like despite being the same information.

According to another embodiment, the processor 120 may identify the similarity between the first information and the second information based on alias information included in at least one from among the first information or the second information. For example, based on the preset attribute being a title, the first information and the second information may be the text of a content title. Based on second information being an alias of the first information even if the texts of the titles of the first information and the second information are different, the processor 120 may identify the first information and the second information as the same title. For example, based on the title relevant to the first information being "AAA," the title relevant to the second information being "BBB," and "BBB" being an alias of "AAA," the processor 120 may identify the first information and the second information as the same information. That is, the processor 120 may identify that the first information and the second information are the same even if the text between the first information and the second information is different as long as they are in an alias relationship. The alias may include an abbreviation of a relevant name, a changed name, and the like.

Because the first metadata and the second metadata may be varied in file format such as csv, j son, xml, or the like, a plurality of modules capable of obtaining the preset attribute according to the respective formats may be provided in the electronic device 100.

The processor 120 may identify the similarity by applying different weights to respective attribute information included in the first and second metadata. For example, because the title attribute of the content is an attribute which may be distinguished relatively easily from other content compared to a different attribute, a relatively higher weight may be applied to the title attribute information. In addition, even if the country information may be the same, because there are multiple different contents present, a relatively lower weight may be applied to the country information than a different attribute. Accordingly, the similarity may be identified as higher when the title information is the same rather than when the country information is the same.

In addition, the processor 120 may identify the similarity by applying different weights to respective attribute information based on content type information included in the first and second metadata. For example, because the number of producers of a movie content is relatively small, the processor 120 may apply a relatively higher weight to the producer information in the case of a movie content. In addition, if the attribute information is metadata on a person, the processor 120 may apply a relatively higher weight to the date of birth information.

The processor 120 may identify the similarity by obtaining information corresponding to a plurality of preset attributes from the first metadata and the second metadata. For example, the similarity may be identified by obtaining the content title and type information included in the first metadata and the second metadata. In an example, if the content title obtained from the first metadata and the second metadata is the same as "AAA," but the content type included in the first metadata is a movie and the content type included in the second metadata is a drama, the processor 120 may identify the first metadata and the second metadata as metadata on a different content.

The processor 120 may generate, based on the first metadata and the second metadata being identified as metadata on the same content, an integrated metadata based on the first metadata and the second metadata.

Specifically, the processor 120 may generate the integrated metadata by including attribute information corresponding to an attribute which is included in the first metadata and not included in the second metadata to the integrated metadata. For example, it may be assumed that the first metadata and the second metadata are metadata on the same content. Based on the attribute on the production year being included in the first metadata but the attribute on the production year not being included in the second metadata, the processor 120 may include the attribute information on the production year to the integrated metadata and generated the integrated metadata. In addition, based on the title included in the first metadata being "AAA" and the title included in the second metadata being "AA-A," the processor 120 may include "AAA" and "AA-A" to the title attribute of the relevant content and generate the integrated metadata. Accordingly, based on a content search request being input to "AA-A" after the integrated metadata is generated, the processor 120 may provide information on the content corresponding to "AAA" and "AA-A."

In addition, the processor 120 may inquire, based on there being an incompatible attribute information in the first metadata and the second metadata, to an external server or include the attribute information selected by the user to the integrated metadata.

In addition, the processor 120 may eliminate unnecessary overlapping when there is the same attribute information in the first metadata and the second metadata and generate the integrated metadata. For example, based on "Hamlet and Othello" being included in the first metadata, and "Othello and Romeo and Juliet" being included in the second metadata, the processor 120 may be configured to process so that "Othello" is not overlapping in the integrated metadata.

The processor 120 may include the first metadata and the second metadata to a format of a preset metadata to generate the integrated metadata. Accordingly, the integrated metadata may be generated by unifying the metadata of different formats from one another received from the plurality of data sources 200 to one format.

The processor 120 may map the integrated metadata to the content and store in the memory 110.

It may be assumed that there are three or more plurality of data sources 200. That is, it may be assumed that there are three or more metadata to be compared.

The processor 120 may identify, based on a third metadata received from a third data source being identified as metadata on the same content as with the second metadata, whether the first to third metadata are metadata on the same content based on the attribute information included in the first metadata and the third metadata. That is, the processor 120 may compare the first metadata and the second metadata, and identify the first to third metadata as the candidate metadata of the same content without comparing the first metadata and the third metadata when it is identified as metadata of the same content by comparing the second metadata and the third metadata. As described above, the candidate metadata on the same content may be first filtered and the time of comparing between metadata may be reduced.

Then, based on identifying as metadata of the same content by comparing the first metadata and the third metadata, the processor 120 may identify the first to third metadata as metadata on the same content. Specifically, the processor 120 may identify whether the first to third metadata are metadata on the same content based on the attribute information corresponding to the attribute different from the preset attribute from among the attribute information included in the first metadata and the third metadata.

Because the first metadata and the third metadata are metadata identified as candidate metadata by comparing the preset attribute information of the second metadata, respectively, the preset attribute information of the first metadata and the third metadata may be similar. Accordingly, the processor 120 may compare the first metadata and the third metadata based on the attribute information different from the preset attribute information.

The processor 120 may again compare not only the first metadata and the third metadata but also the first metadata and the second metadata, and again compare the second metadata and the third metadata. However, because the processor 120 previously performed a comparison based on the first metadata and the second metadata, and the preset attributes of the second metadata and the third metadata, a comparison may be performed again based on an attribute different from the preset attribute.

Based on the first to third metadata being identified as metadata on the same content, the processor 120 may map the integrated metadata generated based on the first to third metadata to the content and store in the memory 110.

An example of first filtering candidate metadata on the same content will be described in detail in FIG. 5.

Figure 5:
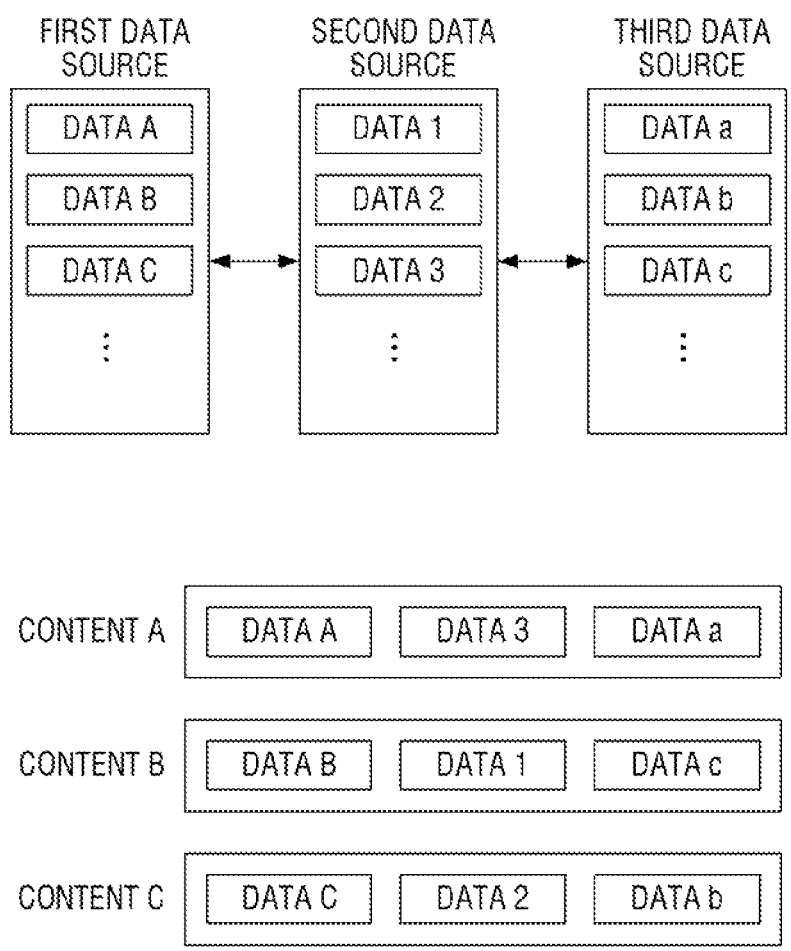
FIG. 5 is a diagram illustrating an operation of identifying similarity based on there being three or more plurality of data sources according to an embodiment.

FIG. 5 is a diagram illustrating an operation of identifying similarity based on there being three or more data sources according to an embodiment.

In FIG. 5, it may be assumed that there are three data sources 200 including data sets. That is, it may be assumed that there are three metadata sets to be compared. Specifically, the processor 120 may receive the plurality of metadata sets from the first data source, the second data source, and the third data source, respectively. For example, it may be assumed that the processor 120 receives data A, data B, data C, and the like from the first data source, receive data 1, data 2, data 3, and the like from the second data source, and data a, data b, data c, and the like from the third data source. The data received from one data source may be metadata of different contents from one another. For example, data A, data B, and data C received from the first data source may be metadata of different contents from one another.

Based on receiving metadata from three or more data sources, the processor 120 may perform a job of identifying metadata on the same content. However, if the processor 120 performs a job of identifying the similarity of the preset attribute information included in all received metadata, a relatively long time may be required. Accordingly, the processor 120 may not identify the similarity between the attribute information included in all metadata with a cross-check method. For example, based on data A and data 3 being identified as metadata on the same content, and data 3 and data a being identified as metadata on the same content, the processor 120 may be configured to identify data A, data 3, and data a as candidate metadata on the same content without comparing data A and data a separately. Here, data A, data 3, and data a may correspond to the first metadata, the second metadata, and the third metadata described above, respectively.

In other words, the processor 120 may compare the plurality of metadata sets received from the first data source with the plurality of metadata sets received from the second data source, and compare the plurality of metadata sets received from the second data source with the plurality of metadata sets received from the third data source to determine the candidate metadata which is identified as metadata of the same content. Based on the processor 120 not comparing the plurality of metadata sets received from the first data source with the plurality of metadata sets received from the third data source, the job time may be shortened, and a computational quantity of the processor 120 may be reduced.

That is, the processor 120 may identify metadata of the same content by using the cross-check method to compare all metadata included in the candidate metadata one on one.

As in FIG. 5, the processor 120 may identify, based on the method as described above, data A, data 3, and data a as candidate metadata identified as metadata of content A, identify data B, data 1, and data c as candidate metadata identified as metadata of content B, and data C, data 2, and data b as candidate metadata identified as metadata of content C.

However, because the processor 120 did not compare the plurality of metadata received from the first data source with the plurality of metadata received from the third data source, the plurality of metadata identified as candidate metadata may not be metadata of the same content. Accordingly, the processor 120 may compare the similarity between the preset attribute information included in the candidate metadata with the cross-check method and again review whether the plurality of metadata is metadata on the same content. The above will be described in detail in FIG. 6.

Figure 6:
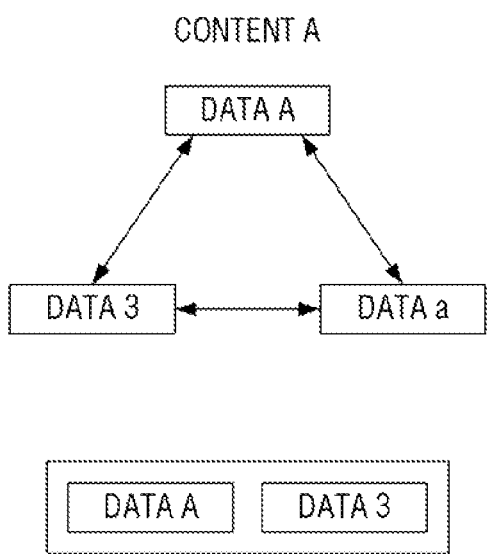
FIG. 6 is a diagram illustrating an operation of identifying metadata on a same content by comparing candidate metadata according to an embodiment.

FIG. 6 is a diagram illustrating an operation of identifying metadata on a same content by comparing candidate metadata according to an embodiment.

Referring to FIG. 6, an operation of comparing data A, data 3, and data a identified as candidate metadata of content A in FIG. 5 will be described.

The processor 120 may compare data A and data a. Specifically, the processor 120 may identify the similarity between the attribute information corresponding to the attribute different from the preset attribute included in data A and data a. Because data A and data a are respectively metadata identified as candidate metadata by comparing the preset attribute information with data 3, the preset attribute information of data A and data a may be similar. Accordingly, the processor 120 may compare data A and data a based on the attribute information different from the preset attribute information. For example, because data A and data a have been respectively identified as candidate metadata based on data 3 and the title information, the title information of data A and data a may be similar. Accordingly, the processor 120 may compare not the title information of data A and data a but, for example, the type information of the content. Based on the type information of the content included in data A being a movie, and the type information of the content included in data a being a drama, the processor 120 may be configured to identify that data A and data a are metadata of different contents. In this case, the processor 120 may be configured to identify one from among data A and data a based on the type information included in data 3. For example, based on the type information of the content included in data 3 being a movie, the processor 120 may be configured to exclude data a and identify data A and data 3 as metadata of content A. Then, the processor 120 may be configured to generate an integrated metadata of content A based on data A and data 3, map the integrated metadata which is generated to content A, and store in the memory 110.

The processor 120 may be configured to again compare not only data A and data a, but also data A and data 3, and again compare data 3 and data a. However, because the processor 120 previously performed a comparison based on data A and data 3, and data 3 and the preset attribute of data a, a comparison may be performed again based on an attribute different from the preset attribute. For example, the processor 120 may compare, based on identifying the candidate metadata with the title which is the preset attribute, data A and data 3, and data 3 and data a based on the character information. That is, because the processor 120 may be configured to perform an additional comparison between the candidate metadata based on the attribute different with the preset attribute, an accuracy as to whether it is the metadata of the same content may be raised.

The processor 120 may be configured so that data A and data a are compared as the preset attribute.

However, based on there being a large number of data sources 200, the candidate metadata may be compared in a tournament method. For example, based on six candidate metadata (A, B, C, D, E and F) being identified, the processor 120 may perform three comparisons such as A:B, C:D and E:F, perform a comparison based on a result of A:B and a result of C:D, and identify the similarity by performing a comparison based on a result of A:B:C:D and a result of E:F.

Referring back to FIG. 3, the processor 120 may obtain the first metadata and the second metadata filtered from an external search engine. Here, the first metadata and the second metadata may be data filtered based on the similarity between information corresponding to the preset attribute from among the plurality of attribute information. Specifically, the processor 120 may transmit all metadata received from the plurality of data sources 200 to the external search engine, and the external search engine may transmit metadata of greater than or equal to a threshold value based on the similarity between information corresponding to the preset attribute from among the plurality of attribute information to the electronic device 100.

That is, the first metadata and the second metadata may be data filtered in advance from the external search engine, and the processor 120 may be configured to reduce time spent in generating the integrated metadata through a comparison between the metadata of which a probability of being metadata of the same content is increased. By comparing the metadata filtered through the external search engine, the computational quantity of the processor 120 may also be reduced. The external search engine may, for example, filter metadata of which the title information is a match and transmit to the electronic device 100.

The external search engine may be an engine capable of a Full Text Search by using Term Frequency-Inverse Document Frequency (TF-IDF) to quickly process a large amount of information.

Based on a content search request being received from an external device 300, the processor 120 may search and provide content corresponding to the content search request based on the integrated metadata. For example, based on the title information included in the first metadata of content A being "AAA," the processor 120 may not be able to search the content A if a content search request is input to "AA-A." However, an integrated metadata may be generated according to an embodiment and "AAA" and "AA-A" may both be included in the integrated metadata as the title of content A. Accordingly, even if the content search request is input to "AA-A," the processor 120 may identify a content A corresponding thereto and provide it to the external device 300.

That is, based on the attribute and attribute information in which the integrated metadata of one content is generated and included in the metadata being relatively increased, the accuracy of a response information corresponding to a user request which is input from the external device 300 may be raised.

Figure 4:
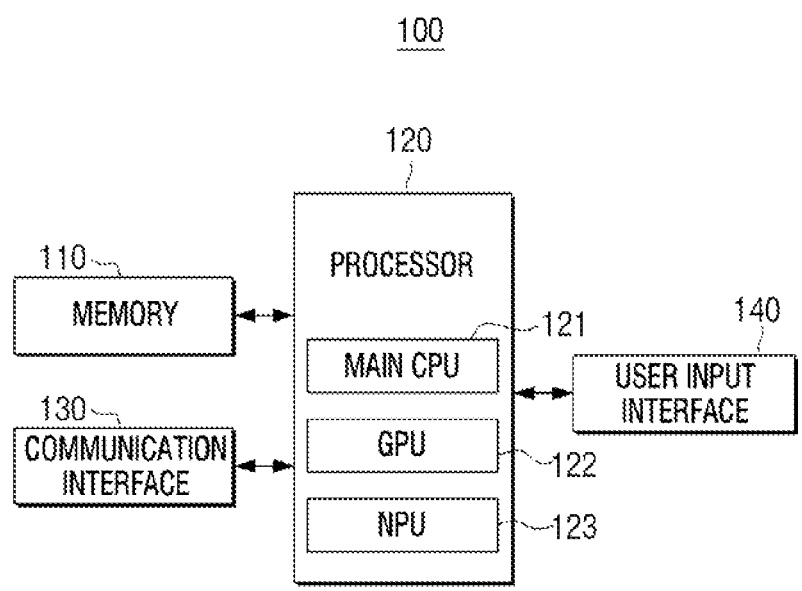
FIG. 4 is a block diagram illustrating a detailed configuration of an electronic device according to an embodiment.

FIG. 4 is a block diagram illustrating a detailed configuration of an electronic device according to an embodiment.

According to FIG. 4, the electronic device 100 may include a memory 110, a processor 120, a communication interface 130, and a user input interface 140. With respect to parts overlapping with the configuration shown in FIG. 3 from among the configuration shown in FIG. 4, the detailed description will be omitted.

The processor 120 may control the overall operation of the electronic device 100 by using the various programs stored in the memory 110. The processor 120 may include a graphics processor 122 (Graphic Processing Unit) for processing graphics corresponding to an image. The processor 120 may be implemented as a System On Chip (SoC) including a core (not shown) and the GPU 122. The processor 120 may include a single core, a dual core, a triple core, a quad core, and a core of a multiple thereof.

The processor 120 may include a main CPU 121, a GPU 122, and a neural processing unit (NPU) 123.

The main CPU 121 may access the memory 110, and use an operating system (O/S) stored in the memory to perform booting. Further the main CPU 121 may be configured to perform various operations by using various programs, content data, and the like stored in the memory 110. Specifically, according to an embodiment, the main CPU 121 may copy a program in the memory 110 to the RAM according to instructions stored in the ROM, and execute a relevant program by accessing the RAM.

The GPU 122 may correspond to a high-performance processing device for graphics processing, and may be a specialized electronic circuitry designed to accelerate image generation within a frame buffer to be output to a screen by quickly processing the memory and changing to an image. In addition, the GPU 122 may refer to a visual processing unit (VPU).

The NPU 123 may correspond to an artificial intelligence (AI) chipset (or, AI processor), and may be an AI accelerator. The NPU 123 may correspond to a processor chip optimized to performing a deep neural network. The NPU 123 may correspond to a processing device executing the deep learning model in place of the GPU 122, and the NPU 123 may also correspond to a processing device executing the deep learning model with the GPU 122.

The communication interface 130 may communicate with the data source 200 and the external device 300. Specifically, the communication interface 130 may receive metadata from respective data sources 200. In addition, the communication interface 130 may receive a signal on the content search request from the external device 300, and transmit the response information corresponding to the search request to the external device 300.

The communication interface 130 may include a Wi-Fi module, a Bluetooth module, a local area network (LAN) module, a wireless communication module, or the like. Here, the respective communication modules may be implemented as at least one hardware chip form. The wireless communication module may include at least one communication chip configured to perform communication according to various wireless communication standards such as ZigBee, Ethernet, Universal Serial Bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), and the like in addition to the above-described communication method. However, this is merely one embodiment, and the communication interface 130 may be configured to use at least one communication module from among the various communication modules.

The user input interface 140 may receive various user commands and information. The processor 120 may execute a function corresponding to the user command input through the user input interface 140, or store the information input through the user input interface 140 in the memory 110.

The user input interface 140 may receive preset attribute information from the user. In addition, the user input interface 140 may receive, based on a plurality of content title information being included in the metadata, content title information which is to be displayed in an external display device from among a plurality of content titles.

The user input interface 140 may include a microphone to receive the user command in a voice form, or may be implemented with a display (touch screen) to receive the user command with a touch.

The display may be implemented in the form of a touch screen which comprises a mutual layer structure with a touch pad. Here, the touch screen may be configured to detect not only a position and area of a touch input, but also a pressure of the touch input.

In addition, the user input interface 140 may be configured to receive a signal including information on the user command or job from a separate control device (not shown) to control the electronic device 100.

FIG. 7 is a diagram illustrating an example of a preset format of an integrated metadata according to an embodiment.

The electronic device 100 may generate an integrated metadata by integrating the plurality of metadata sets generated in different formats from one another on one content as in FIG. 1 to the format of a preset metadata.

As in FIG. 7, the electronic device 100 may use the preset format (common format) of a content or a program to generate the integrated metadata of the content or the program, and use the preset format (common format) of a person to generate the integrated metadata of the person. However, the format shown in FIG. 7 is merely one example of the preset format and is not limited thereto.

Figure 8:
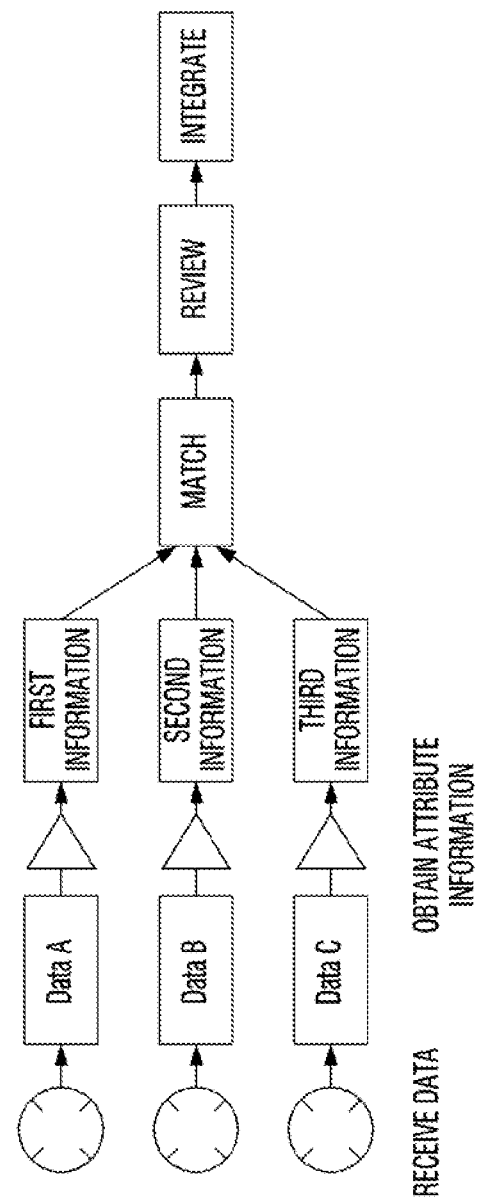
FIG. 8 is a diagram illustrating an operation of respective steps for generating integrated metadata according to an embodiment.

FIG. 8 is a diagram illustrating an operation of respective steps for generating integrated metadata according to an embodiment.

The electronic device 100 may be configured to receive metadata from the respective data sources 200. The illustrated data A, data B, and data C may refer to metadata sets received from the respective data sources 200, and may be in plurality. Then, the electronic device 100 may obtain or extract preset attribute information from the received metadata. For example, the electronic device 100 may obtain the first information, the second information, and the third information corresponding to the preset attribute information from at least one metadata set included in data A, at least one metadata set included in data B, and at least one metadata set included in data C.

Then, the electronic device 100 may be configured to identify the similarity between the first information and the second information, and perform a matching step of identifying the similarity between the second information and the third information. The electronic device 100 may identify candidate metadata on one content by performing the matching step. Then, the electronic device 100 may perform a review step of comparing between candidate metadata through the cross-check method. Specifically, the electronic device 100 may compare the first information and the third information based on the attribute different from the preset attribute. In addition, the electronic device 100 may again compare the first information and the second information based on the attribute different from the preset attribute, and compare the second information and the third information based on the attribute different from the preset attribute. That is, the review step may be a step of increasing accuracy on whether the candidate metadata is metadata on one content by comparing the first to third information in the cross-check method.

Then, the electronic device 100 may generate an integrated metadata by integrating the plurality of metadata on one content.

Figure 9:
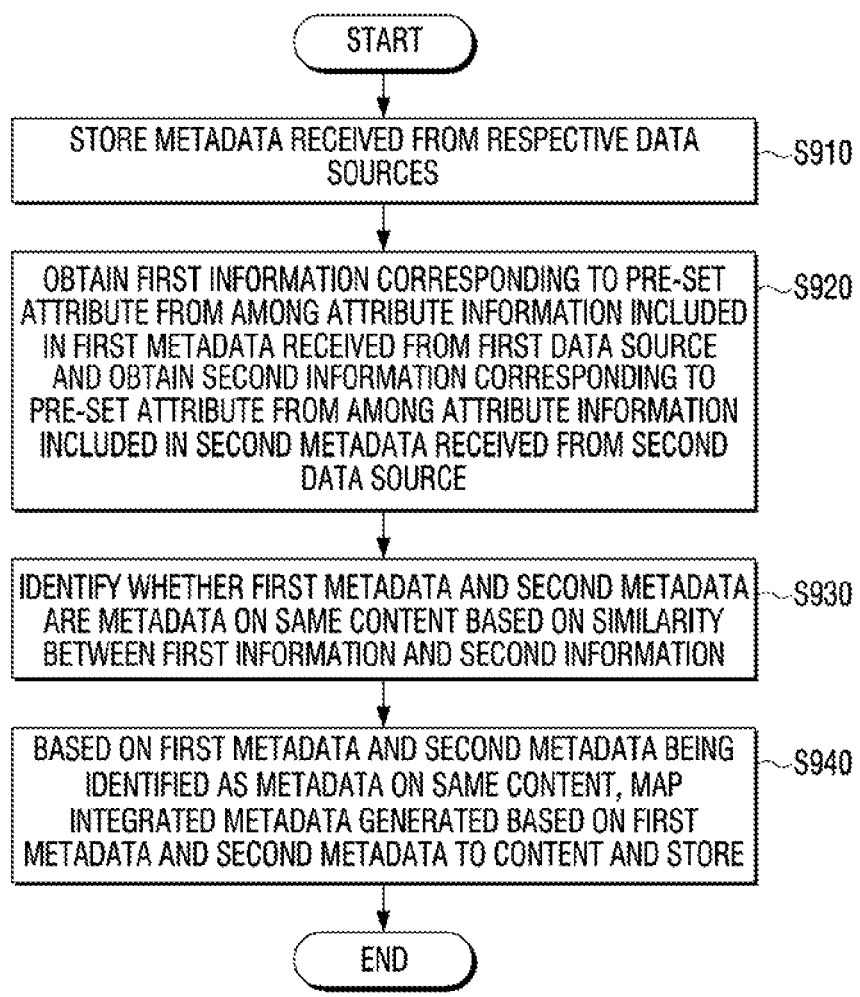
FIG. 9 is a flowchart of a method of controlling an electronic device according to an embodiment.

FIG. 9 is a flowchart of a control method of an electronic device according to an embodiment.

The electronic device 100 may be configured to store metadata received from the respective data sources 200 (S910).

The electronic device 100 may obtain the first information corresponding to the preset attribute from among attribute information included in the first metadata received from the first data source from among the plurality of data sources, and obtain the second information corresponding to the preset attribute from among attribute information included in the second metadata received from the second data source (S920).

Here, the preset attribute may include at least one from among the title, the type, the production year, the character information, the producer information or the country information of the content.

The electronic device 100 may obtain the first metadata and the second metadata filtered from the external search engine, and the first metadata and the second metadata may be data filtered based on the similarity between information corresponding to the preset attribute from among the attribute information.

The electronic device 100 may identify whether the first metadata and the second metadata are metadata on the same content based on the similarity between the first information and the second information (S930).

Specifically, the electronic device 100 may identify the similarity between the first information and the second information based on the text similarity between the first information and the second information, or the alias information included in at least one from among the first information and the second information. For example, the electronic device 100 may identify the text similarity based on an algorithm including at least one from among algorithms such as Longest Common Subsequence (LCS), N-Gram, Soundex, or Levenshtein (Edit) Distance.

In addition, the electronic device 100 may identify similarity by applying different weights to respective attribute information based on the content type information included in the first and second metadata.

The electronic device 100 may map, based on the first metadata and the second metadata being identified as metadata on the same content, the integrated metadata generated based on the first metadata and the second metadata to the content and store (S940).

For example, the electronic device 100 may generate the integrated metadata by including the attribute information corresponding to the attribute which is included in the first metadata and not included in the second metadata to the integrated metadata.

The electronic device 100 may search and provide, based on receiving the content search request from the external device, content corresponding to the content search request based on the integrated metadata.

It may be assumed that there are three or more data sources 200, that is, there are three or more metadata sets to be compared. For example, it may be assumed that the first to third metadata sets are compared.

The electronic device 100 may identify whether the first metadata and the second metadata are metadata on the same content based on the similarity between the first information and the second information.

The electronic device 100 may identify, based on the third metadata received from the third data source being identified as metadata on the same content as with the second metadata, whether the first to third metadata are metadata on the same content based on the attribute information included in the first metadata and the third metadata. Specifically, the electronic device 100 may identify whether the first to third metadata sets are metadata on the same content based on the attribute information corresponding to the attribute different from the preset attribute from among the attribute information included in the first metadata and the third metadata.

The electronic device 100 may map, based on the first to third metadata being identified as metadata on the same content, the integrated metadata generated based on the first to third metadata to the content and store.

Because the detailed operations of the respective steps have been described above, the detailed description will be omitted.

The methods according to the various example embodiments described above may be implemented in the form of an application installable to an electronic device of the related art.

In addition, the methods according to the various example embodiments described above may be implemented by a software upgrade or a hardware upgrade only on the electronic device of the related art.

In addition, the various example embodiments described above may be performed through an embedded server provided in the electronic device, or through at least one external server from among the electronic devices.

According to an embodiment, the various example embodiments may be implemented with software including instructions stored in a machine-readable storage media (e.g., computer). The machine may call an instruction stored in the storage medium, and as a device capable of operating according to the called instruction, may include an electronic device according to example embodiments described above. Based on the instruction being executed by the processor, the processor may directly or using other elements under the control of the processor perform a function corresponding to the instruction. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

According to an embodiment, a method according to the various example embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In addition, according to an embodiment, the various example embodiments described above may be implemented in a recordable medium which is readable by a computer or a device similar to the computer using a software, a hardware, or the combination of a software and a hardware. In some cases, the example embodiments described herein may be implemented by the processor 130 itself. According to a software implementation, embodiments such as the procedures and functions described herein may be implemented with separate software modules. The respective software modules may perform one or more of the functions and operations described herein.

The computer instructions for performing processing operations in the device according to the various example embodiments may be stored in a non-transitory computer-readable medium. The computer instructions stored in this non-transitory computer-readable medium may cause a specific device to perform the processing operations in the device according to the various example embodiments when executed by the processor of the specific device. The non-transitory computer readable medium may refer to a medium that stores data semi-permanently, and is readable by a device rather than a medium that stores data for a very short time, such as a register, a cache, a memory, or the like. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to the various example embodiments may be comprised of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by respective corresponding elements prior to integration. Operations performed by a module, program, or other element, in accordance with various example embodiments may be performed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic device, comprising:
a communication interface;
a memory; and
a processor configured to:
    store metadata received from a plurality of data sources, respectively, in the memory,
    transmit, through the communication interface, first metadata and second metadata to an external search engine,
    obtain, through the communication interface, the first metadata and the second metadata filtered from the external search engine, wherein the first metadata and the second metadata are filtered based on a similarity between pieces of information corresponding to a preset attribute from among a plurality of attribute information,
    obtain first information corresponding to the preset attribute from among a plurality of attribute information comprised in the first metadata filtered from the external search engine,
    obtain second information corresponding to the preset attribute from among a plurality of attribute information comprised in the second metadata filtered from the external search engine, and
    map, based on the first metadata and the second metadata being identified as metadata on a same content based on a similarity between the first information and the second information, an integrated metadata generated based on the filtered first metadata and the filtered second metadata to the same content and store the mapped integrated metadata generated based on the filtered first metadata and the filtered second metadata in the memory.

2. The electronic device of claim 1, wherein the processor is further configured to identify, based on third metadata received from a third data source and the second metadata being identified as metadata on the same content, whether the first metadata, the second metadata, and the third metadata are metadata on the same content based on attribute information comprised in the first metadata and the third metadata, and
    map, based on the first metadata, the second metadata, and the third metadata being identified as metadata on the same content, an integrated metadata generated based on the first metadata, the second metadata, and the third metadata to the same content and store the mapped integrated metadata generated based on the first metadata, the second metadata, and the third metadata in the memory.

3. The electronic device of claim 2, wherein the processor is further configured to identify whether the first metadata, the second metadata, and the third metadata are metadata on the same content based on attribute information corresponding to an attribute different from the preset attribute from among the attribute information comprised in the first metadata and the third metadata.

4. The electronic device of claim 1, wherein the processor is further configured to generate the integrated metadata by including attribute information corresponding to an attribute comprised in the filtered first metadata and not comprised in the filtered second metadata to the integrated metadata.

5. The electronic device of claim 1, wherein the preset attribute comprises at least one from among a title, a type, a production year, character information, producer information, or country information of a content.

6. The electronic device of claim 1, wherein the processor is further configured to identify the similarity between the first information and the second information based on a text similarity between the first information and the second information, or alias information comprised in at least one from among the first information or the second information.

7. The electronic device of claim 6, wherein the processor is further configured to identify the text similarity based on an algorithm comprising at least one from among a Longest Common Subsequence algorithm, a N-Gram algorithm, a Soundex algorithm, or a Levenshtein Distance algorithm.

8. The electronic device of claim 1, wherein the processor is further configured to identify the similarity between the first information and the second information by applying different weights to respective attribute information based on content type information comprised in the first metadata and the second metadata.

9. The electronic device of claim 1, wherein the processor is further configured to search and provide, based on a content search request being received from an external device, content corresponding to the content search request based on the integrated metadata.

10. A method of controlling an electronic device, the method comprising:
    storing metadata received from a plurality of data sources, respectively;
    transmitting first metadata and second metadata to an external search engine;
    obtaining the first metadata and the second metadata filtered from the external search engine, wherein the first metadata and the second metadata are filtered based on a similarity between pieces of information corresponding to a preset attribute from among a plurality of attribute information;
    obtaining first information corresponding to-a the preset attribute from among a plurality of attribute information comprised in the first metadata filtered from the external search engine;
    obtaining second information corresponding to the preset attribute from among a plurality of attribute information comprised in the second metadata filtered from the external search engine;
    identifying whether the first metadata and the second metadata are metadata on a same content based on a similarity between the first information and the second information; and
    mapping, based on the first metadata and the second metadata being identified as metadata on the same content, an integrated metadata generated based on the filtered first metadata and the filtered second metadata to the content and storing the mapped integrated metadata generated based on the filtered first metadata and the filtered second metadata.

11. The method of claim 10, further comprising:
    identifying, based on a third metadata received from a third data source and the second metadata being identified as metadata on the same content, whether the first metadata, the second metadata, and the third metadata are metadata on the same content based on attribute information comprised in the first metadata and the third metadata, and
    mapping, based on the first metadata, the second metadata, and the third metadata being identified as metadata on the same content, an integrated metadata generated based on the first metadata, the second metadata, and the third metadata to the content and storing the mapped integrated metadata generated based on the first metadata, the second metadata, and the third metadata.

12. The method of claim 11, further comprising identifying whether the first metadata, the second metadata, and the third metadata are metadata on the same content based on attribute information corresponding to an attribute different from the preset attribute from among attribute information comprised in the first metadata and the third metadata.

13. The method of claim 10, wherein the mapping and storing the content comprises generating the integrated metadata by including attribute information corresponding to an attribute comprised in the filtered first metadata and not comprised in the filtered second metadata to the integrated metadata.

14. The method of claim 10, wherein the preset attribute comprises at least one from among a title, a type, a production year, character information, producer information or country information of a content.

* * * * *